ALBERT G. BARRETT.

Improvement in Railway Car Wheels.

No. 121,075.  Patented Nov. 21, 1871.

Witnesses.
C. F. Brown
C. O. Brown

Albert G. Barrett,
Inventor. by
Geo. E. Brown,
Atty.

UNITED STATES PATENT OFFICE.

ALBERT G. BARRETT, OF BARRETT, KANSAS.

IMPROVEMENT IN RAILWAY CAR-WHEELS.

Specification forming part of Letters Patent No. 121,075, dated November 21, 1871.

*To all whom it may concern:*

Be it known that I, ALBERT G. BARRETT, of Barrett, Marshall county, Kansas, have invented an Improvement in Car-Wheels, of which the following is a specification:

This invention relates to a rigidly-rimmed wheel having elastic curved spokes, by means of which the hub is both suspended and supported in such manner that it can yield when acted upon by a sufficient force, and return to the center of the wheel upon the cessation of such force, thereby tending to prevent breakage of the wheel and concussion of the carriage.

Figure 1:
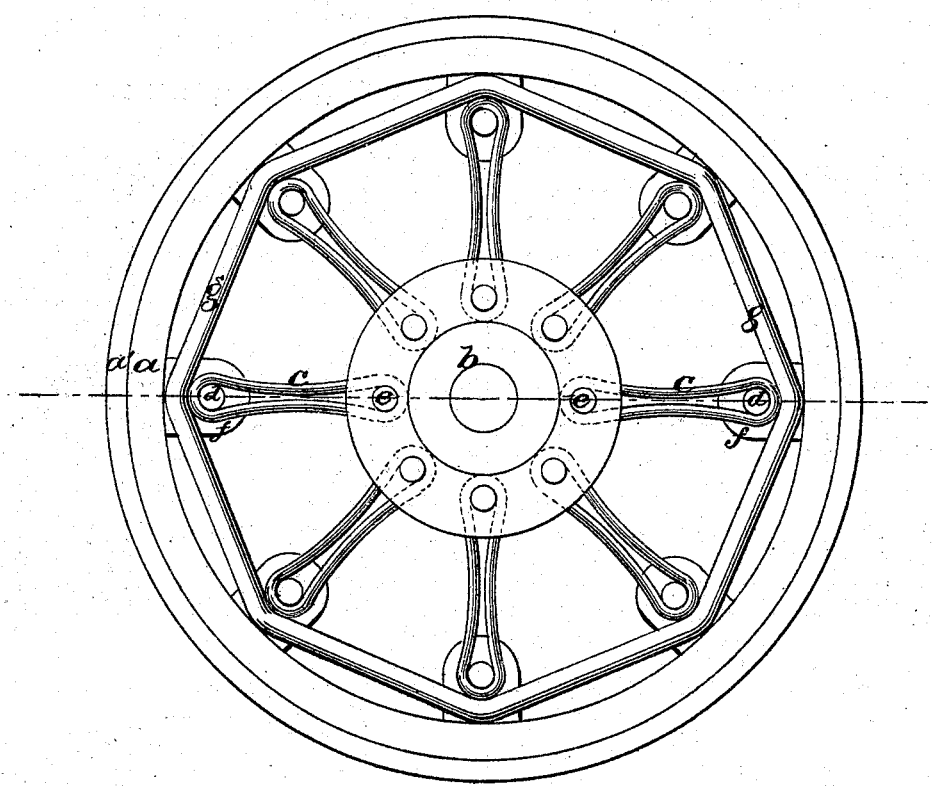
Figure 2:
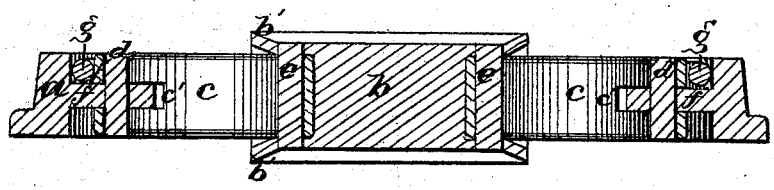
Figure 3:

Referring to the drawing—in which Figure 1 is a side elevation, Fig. 2 a transverse vertical section, and Fig. 3 is a detached side elevation of a single spoke—A is the rigid wrought-iron or steel rim; $b$, the hub, having two parallel circular flanges cast on its rim flush with its sides. $c$ are the elastic steel spokes, either single, as shown in Fig. 3, or double, as shown in Fig. 1, and curved in any desired shape, though but two shapes are shown, viz., the sinuous, Fig. 3, which is, perhaps, that best adapted to the single spoke, and the simple curve, Fig. 1, where the two branches of the spoke form a double concave. In the perimeter of the hub, between the flanges $b'$, are formed semicircular recesses for the ends of the spokes to enter, these ends being of the same shape whether the spokes are single or double. The spokes may be secured to the hub by means of pins $e$ passing through both flanges $b'$, and between the branches of the double spokes, or through the hooks at the ends of the single spokes, and pressing the extremities of the spokes into the recesses in the hubs. The outer ends of the spokes may be secured upon pins $d$ projecting from blocks $f$ that are fastened to the rim $a$ in any sufficient manner, and extend radially from the inner side thereof. Between the outer ends of the spokes and the inside of the rim may be placed a polygonal wrought-iron or steel girdle, $g$, the angles of which should be pressed tightly against the spokes by the contraction of the tire $a'$. The girdle strengthens the rim. The pins $d$ should be so placed as to draw the spokes tightly against the rim. A recess, $c'$, is formed crosswise and centrally of the outer end of each spoke to receive the block $f$. The elastic spokes $c$ take the place of springs situated between cars or carriage-bodies and their axles. Under a vertical strain the hubs sink, the lower spokes shortening or increasing their curvature and the upper spokes lengthening or decreasing their curvature. Hence not only is the capacity of the wheel to endure shocks increased by the elasticity thus imparted to it, but its carrying power is augmented by the co-operation of both the upper and lower spokes in sustaining pressure. In wheels with stiff spokes all the weight is supported by the lower spokes, while in my improved wheel the weight is both supported upon the lower spokes and suspended from the upper ones. The elasticity of the wheel depends on the number of the spokes and the extent of their curvature, and the effect under a vertical strain is the same whether the apex of the curve be placed at the middle of the spoke or near either end thereof. A strain exerted horizontally or parallel with the axis deflects the spokes sidewise. The flanges $b'$ flare outward each way so as to admit of such deflection.

It is as practicable to build carriage-wheels with elastic spokes as car-wheels, and therefore I do not limit my claim to the latter, nor the particulars herein set forth of the manner of construction or connection of the several parts.

The necessities of the invention are, for car-wheels, a stiff rim, elastic spokes, and rigid connections between the spokes and rim and spokes and hub. For carriage-wheels, stiffness of the rim is not an absolute necessity, though it is a desideratum.

I claim as my invention—

1. A car-wheel having a hub suspended from the rim by means of elastic spokes, substantially as described.

2. A wheel provided with a polygonal strengthening-girdle, as described.

ALBERT G. BARRETT.

Witnesses:
C. C. BLOSSOM,
D. C. McLEAN. (122)